US010963701B2

(12) United States Patent
Lin et al.

(10) Patent No.: US 10,963,701 B2
(45) Date of Patent: *Mar. 30, 2021

(54) TECHNIQUES FOR IDENTIFYING AND INDEXING DISTINGUISHING FEATURES IN A VIDEO FEED

(71) Applicant: Vivint, Inc., Provo, UT (US)

(72) Inventors: Rongbin Lanny Lin, Orem, UT (US); Brandon Bunker, Highland, UT (US); Aaron Davis, Pleasant Grove, UT (US); Shiwei Liu, Draper, UT (US); Matthew Mahar, Salt Lake City, UT (US); Matthew J. Eyring, Provo, UT (US); Clint Gordon-Carroll, Orem, UT (US); Jeremy B. Warren, Draper, UT (US); James Ellis Nye, Alpine, UT (US); Jefferson Lyman, Alpine, UT (US)

(73) Assignee: Vivint, Inc., Provo, UT (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/889,020

(22) Filed: Feb. 5, 2018

(65) Prior Publication Data

US 2018/0225520 A1 Aug. 9, 2018

Related U.S. Application Data

(63) Continuation of application No. 14/629,207, filed on Feb. 23, 2015, now Pat. No. 9,886,633.

(51) Int. Cl.
*H04N 9/80* (2006.01)
*G06K 9/00* (2006.01)
(Continued)

(52) U.S. Cl.
CPC ........ *G06K 9/00751* (2013.01); *G11B 27/028* (2013.01); *G11B 27/30* (2013.01)

(58) Field of Classification Search
USPC .......................................... 386/241, 248, 278
See application file for complete search history.

(56) References Cited

U.S. PATENT DOCUMENTS

| 6,188,831 | B1 * | 2/2001 | Ichimura .............. H04N 5/9261 360/72.1 |
| 6,323,897 | B1 * | 11/2001 | Kogane ............ G08B 13/19634 348/152 |

(Continued)

FOREIGN PATENT DOCUMENTS

WO 2009012289 A1 1/2009

OTHER PUBLICATIONS

PCT International Search Report for International Application No. PCT/US2016/014925, dated May 26, 2016 (3 pp.).

*Primary Examiner* — Nigar Chowdhury
(74) *Attorney, Agent, or Firm* — Holland & Hart, LLP

(57) ABSTRACT

A method for security and/or automation systems is described. In one embodiment, the method may include receiving a plurality of video footage at a home automation system from at least one video monitor. The method may further include reviewing the plurality of video footage recorded over a predetermined period of time. The method may further include automatically identifying at least one distinguishing feature in the video footage over the predetermined period of time, and automatically indexing the video footage based, at least in part, on identifying the at least one distinguishing feature in the video footage.

15 Claims, 8 Drawing Sheets

(51) Int. Cl.
    *G11B 27/028* (2006.01)
    *G11B 27/30* (2006.01)
    *H04N 5/93* (2006.01)
    *G11B 27/00* (2006.01)

(56) References Cited

U.S. PATENT DOCUMENTS

| | | |
|---|---|---|
| 7,792,256 B1 | 9/2010 | Arledge et al. |
| 8,180,713 B1* | 5/2012 | Rigby .................... G06Q 40/08 |
| | | 706/12 |
| 8,442,384 B2 | 5/2013 | Bronstein et al. |
| 9,451,178 B2* | 9/2016 | Kelder ................. H04N 5/2621 |
| 9,471,849 B2* | 10/2016 | Gurwicz .............. G06K 9/6263 |
| 2002/0133520 A1 | 9/2002 | Tanner |
| 2003/0118329 A1* | 6/2003 | Obrador ............... G11B 27/102 |
| | | 386/333 |
| 2003/0151662 A1* | 8/2003 | Bopp .................... H04N 7/181 |
| | | 348/139 |
| 2005/0031296 A1 | 2/2005 | Grosvenor |
| 2006/0004582 A1* | 1/2006 | Claudatos ........... G08B 13/1672 |
| | | 704/275 |
| 2007/0115358 A1* | 5/2007 | McCormack ........ G08B 13/196 |
| | | 348/159 |
| 2007/0294622 A1* | 12/2007 | Sterner ................. G06Q 30/00 |
| | | 715/716 |
| 2008/0080743 A1* | 4/2008 | Schneiderman ... G06K 9/00295 |
| | | 382/118 |
| 2008/0193016 A1 | 8/2008 | Lim et al. |
| 2008/0201190 A1 | 8/2008 | Compton et al. |
| 2008/0208872 A1 | 8/2008 | Gavalda |
| 2009/0067586 A1 | 3/2009 | Fano |
| 2009/0268079 A1* | 10/2009 | Motomura ......... H04N 5/23212 |
| | | 348/347 |
| 2010/0005485 A1 | 1/2010 | Tian et al. |
| 2010/0074590 A1* | 3/2010 | Momosaki ........... G11B 27/034 |
| | | 386/278 |
| 2010/0102512 A1* | 4/2010 | Dar ............................ F41J 9/18 |
| | | 273/362 |
| 2010/0220194 A1 | 9/2010 | Ishiko et al. |
| 2010/0231714 A1 | 9/2010 | Flores et al. |
| 2012/0148103 A1* | 6/2012 | Hampel ............. G06K 9/00771 |
| | | 382/103 |
| 2012/0229647 A1 | 9/2012 | Caiman et al. |
| 2012/0263430 A1 | 10/2012 | Spitzer-Williams |
| 2012/0288165 A1* | 11/2012 | Bedros ............... G06K 9/00221 |
| | | 382/118 |
| 2013/0121527 A1 | 5/2013 | Chambers et al. |
| 2013/0216107 A1* | 8/2013 | Huang ............... G06K 9/00295 |
| | | 382/118 |
| 2013/0259456 A1* | 10/2013 | Viswanathan ........... F24C 1/08 |
| | | 392/407 |
| 2014/0037262 A1* | 2/2014 | Sako ........................ H04N 5/77 |
| | | 386/223 |
| 2014/0085501 A1 | 3/2014 | Tran |
| 2014/0105577 A1* | 4/2014 | Wang ....................... H04N 5/76 |
| | | 386/241 |
| 2014/0201631 A1* | 7/2014 | Pornprasitsakul ... G11B 27/031 |
| | | 715/716 |
| 2014/0289323 A1* | 9/2014 | Kutaragi ................ G06Q 50/01 |
| | | 709/203 |
| 2014/0300758 A1 | 10/2014 | Tran |
| 2014/0324879 A1* | 10/2014 | Trease ................... G06F 16/951 |
| | | 707/741 |
| 2014/0361988 A1* | 12/2014 | Katz ....................... G06F 3/011 |
| | | 345/156 |
| 2016/0071390 A1* | 3/2016 | Sales ..................... A61B 5/4266 |
| | | 340/573.1 |
| 2020/0020356 A1* | 1/2020 | Smith ..................... H04N 5/772 |

\* cited by examiner

TECHNIQUES FOR IDENTIFYING AND INDEXING DISTINGUISHING FEATURES IN A VIDEO FEED

CROSS-REFERENCE TO RELATED APPLICATIONS

The present Application is a continuation of U.S. patent application Ser. No. 14/629,207, filed Feb. 23, 2015, and entitled TECHNIQUES FOR IDENTIFYING AND INDEXING DISTINGUISHING FEATURES IN A VIDEO FEED.

BACKGROUND

The present disclosure, for example, relates to security and/or automation systems, and more specifically to automatically indexing video footage based, at least in part, on automatically identifying at least one distinguishing feature in the video footage.

Home automation systems are widely deployed to provide various types of communication and functional features such as monitoring, communication, notification, and/or others. These systems may be capable of supporting communication with a user through a communication connection or a system management action.

Many homeowners are increasingly making use of video monitoring systems throughout their properties for both security and personal uses. Some cameras may be motion activated, while others may record on a continuous basis. Yet homeowners may only be interested in viewing recorded video clips containing family members or pets, and further may only be interested in clips containing family members and pets in action, as opposed to merely passing by the camera, or in a resting state. Yet because the video cameras are often continuously recording, homeowners may be required to look through hours of footage or clips to identify mere minutes' or seconds' worth of "interesting action."

SUMMARY

While some existing home video monitors may be configured to activate recording functionality only based on detected motion in an effort to avoid recording uninteresting footage, this technology may prove largely unreliable when, for example, weather events may trigger motion or light sensors for outdoor cameras such that video monitoring is activated any time lightning strikes or the wind blows. Similarly, indoor video monitors may become activated merely by a person or pet walking past a camera having a motion detector, such that much of the recorded footage may comprise unnecessary and uninteresting "passing by" footage. It may therefore be advantageous to provide an automatic video analytics system to parse through the largely uninteresting footage to provide an easy-to-use "smart summary" of clips containing footage of interest to the user.

Accordingly, in one embodiment, a method for security and/or automation systems is provided. In one embodiment, the method may comprise receiving a plurality of video footage at a home automation system from at least one video monitor. The method may further comprise reviewing the plurality of video footage recorded over a predetermined period of time, and automatically identifying at least one distinguishing feature in the video footage over the predetermined period of time. The method may further comprise automatically indexing the video footage based, at least in part, on identifying the at least one distinguishing feature in the video footage.

One aspect of the present invention relates to providing systems and methods for automatically sorting through recorded video monitor footage, using a variety of criteria, to identify only those clips containing information that may be of interest to the user. The relevant clips may be presented to the user as a series of clips; as a single, condensed video of all pertinent clips; or alternatively or in addition, in the form of still photos arranged as a "storyboard" to show related events occurring over a predetermined period of time.

This may be achieved by indexing footage containing "distinguishing features," where the distinguishing features may comprise identified people or animals, audio features, visual features, times, locations, detected increased occupancy, detected motion, a facial expression, or the like. For example, the home automation system may index recorded footage containing household pets, where the system may flag only those scenes in which the pets are active, as opposed to sleeping or simply walking past the at least one home video monitor.

In some embodiments, the home automation system may automatically identify distinguishing features by comparing footage, for example, recorded over the past month, and identifying any scenes containing elements not commonly contained in the footage. For example, the footage recorded over the span of a month may largely contain "passing by" or resting footage of home occupants, and may therefore be passed over or discarded as "uninteresting" footage. Some footage recorded over the month may contain less common features. These uncommon scenes may be identified as containing one or more distinguishing features, and may be indexed based on common features among the uncommon scenes, such as common audio, common locations, or commonly identified individuals or pets.

In other embodiments, the home automation system may identify footage containing distinguishing features based on key features that may indicate that something "interesting" is happening. For example, the home automation system may index footage containing laughter, which may be identified by audio recordings; or footage containing larger than usual groups of occupants, identified, for example, by motion, video, or other occupancy sensors. In some embodiments, the home automation system may identify footage containing key events, such as birthdays and holidays, by identifying footage containing, for example, balloons, Christmas trees, particular audio associated with such events (e.g., the "Happy Birthday" song, clapping, jingle bells, etc.), or the like. In some embodiments, the home automation system may index a greater number, or longer, clips recorded during such notable events. The identification of such notable events may occur based on user input (i.e., inputting dates of each occupant's birthday), or may be learned by the system (e.g., noting increased "interesting" scenes every December 31st). In some embodiments, the system may identify distinguishing features in footage based on uncommon occurrences for an identified individual. For example, using facial recognition technology, the system may note that Sally rarely smiles, and may therefore mark as containing a distinguishing feature any scenes in which Sally smiles. Where the system identifies a baby, in another example, the system may note as containing distinguishing features scenes in which a baby performs actions not previously performed, such as taking his first steps.

Moreover, the home automation system may index recorded video footage based on identified activities. For example, the home automation system may use facial recognition technology to identify clips containing a particular individual, and may identify particular activities undertaken by the individual by detecting, for example, patterns among the individual's location in the house, audio recordings, time of day, week, or year, or a combination thereof. In some embodiments, the home automation system may index recorded video footage based on identified activities without limiting the indexing to any particular individual. Thus, the system may identify any home occupants performing a particular activity, such as playing the piano, based on, for example, commonly detected motion at the location of the piano, audio, time, or a combination thereof.

In organizing the indexed footage, the home automation system may assemble footage into clips, single continuous films, or still images, any of which may be viewed or played back at any of a control panel, a local computing device (such as a smartphone or personal computer), or a combination thereof. Where the footage is assembled into clips or thumbnails, the system may display a condensed version of the clips, for example a five-second clip of the most "interesting" portion of the clip, which may be expanded into a longer recording upon selection by the user. Additionally, where the footage is assembled into still images, the still images may be presented to the homeowner in the form of a "storyboard," such that when viewed together, the images "tell the story" of interesting activities recorded of particular individuals, pets, or activities over a given period of time.

The clips may also be compiled into a single video, so that the homeowner may view the entire relevant footage in one cut. For example, a homeowner may be presented with a five minute video compiling all of the clips recorded throughout the day in which his cat was featured, but where any scenes in which the cat was sitting or lying still, or was merely passing by a camera, have been removed.

In some embodiments, video indexing may be used to detect emergency events. For example, a smart home system may monitor currently recording footage containing an elderly family member, and may issue an alert when, using a combination of facial recognition and motion, vibration, or vital sign sensors, it is detected that the elderly person has fallen, or has experienced a medical emergency. The alert may be communicated to the homeowner or an emergency dispatcher so that assistance may be provided.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The systems and methods described herein relate to providing a means for automatically identifying distinguishing features in a plurality of video footage, and indexing the footage on the basis of the identified distinguishing features.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
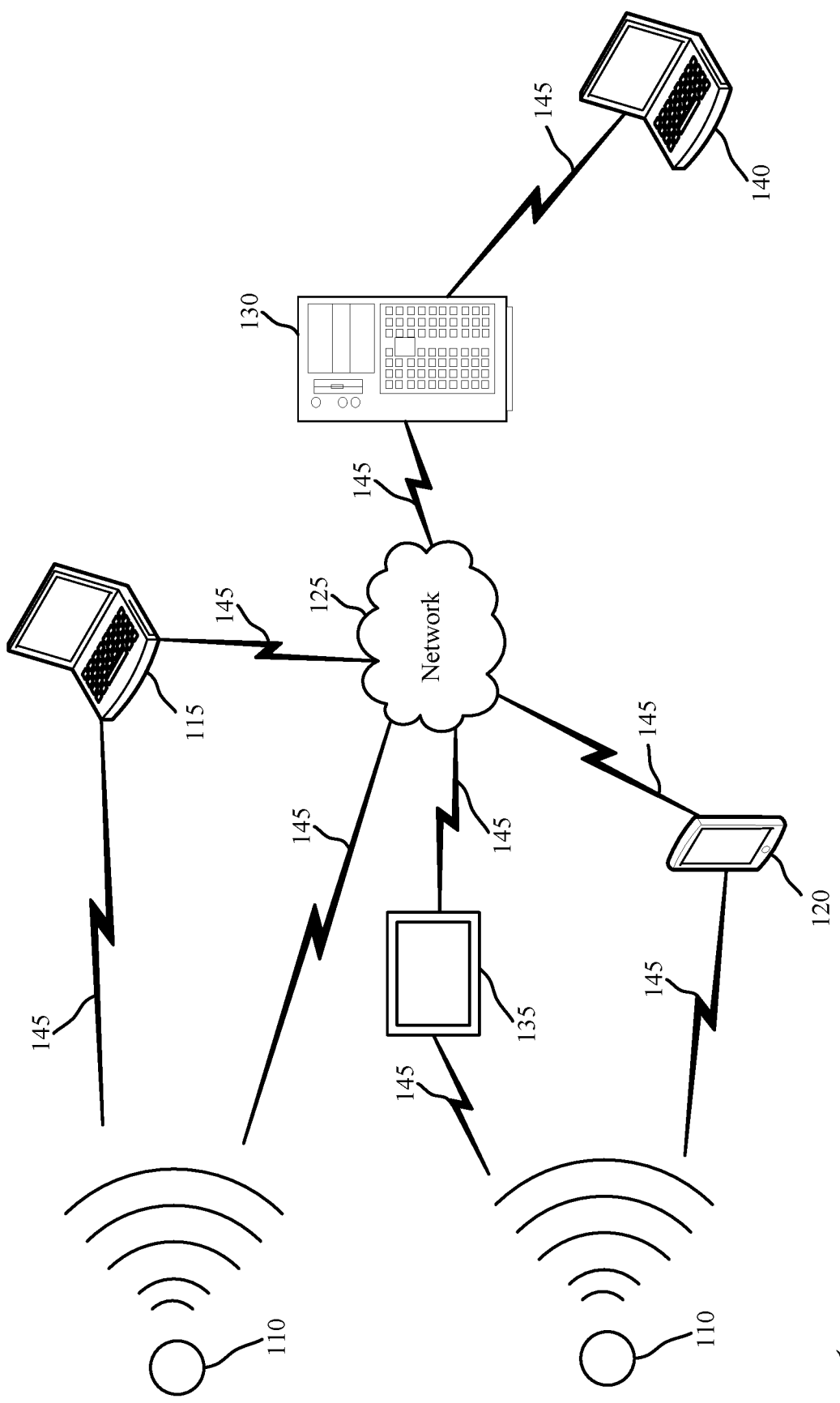
FIG. 1 is a block diagram of an example of a security and/or automation system, in accordance with various embodiments.

FIG. 1 is an example of a home automation system 100 in accordance with various aspects of the disclosure. In some embodiments, the home automation system 100 may include one or more sensor units 110, a local computing device 115, 120, a network 125, a server 130, a control panel 135, and a remote computing device 140. The network 125 may provide user authentication, encryption, access authorization, tracking, Internet Protocol (IP) connectivity, and other access, calculation, modification, and/or functions. The control panel 135 may interface with the network 125 through wired and/or wireless communication links 145 and may perform communication configuration, adjustment, and/or scheduling for communication with local computing device 115, 120 or remote computing device 140, or may operate under the control of a controller. Control panel 135 may communicate with a backend server 130—directly and/or indirectly—using one or more communication links 145.

The control panel 135 may wirelessly communicate via communication links 145 with the local computing device 115, 120 via one or more antennas. The control panel 135 may provide communication coverage for a geographic coverage area. In some examples, control panel 135 may be referred to as a control device, a base transceiver station, a radio base station, an access point, a radio transceiver, a home automation control panel, a smart home panel, or some other suitable terminology. The geographic coverage area for control panel 135 may be divided into sectors making up only a portion of the coverage area. The home automation system 100 may include one or more control panels 135 of different types. The control panel 135 may be related to one or more discrete structures (e.g., a home, a business) and each of the one more discrete structures may be related to one or more discrete areas. In some embodiments, control panel 135 may be a home automation system control panel, for example an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 130, and network 125.

As described in more detail below with respect to FIGS. 2-3, the control panel 135 may be operable to receive a plurality of video footage from one or more sensor units 110, and to review the video footage recorded over a predetermined period of time to automatically identify at least one distinguishing feature in the video footage. The control panel 135 may further be operable to automatically index the video footage based, at least in part, on identifying the at least one distinguishing feature in the video footage. The indexed video footage may then be viewable by a user at the control panel 135, or alternatively at a local computing device 115, 120 or remote computing device 140.

The local computing devices 115, 120 may be dispersed throughout the home automation system 100 and each device 115, 120 may be stationary and/or mobile. Local computing devices 115, 120 and remote computing device 140 may be custom computing entities configured to interact with one or more sensor units 110 via network 125, and in some embodiments, via server 130. In other embodiments, local computing devices 115, 120 and remote computing device 140 may be general purpose computing entities. A computing device 115, 120 or 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, and/or the like. A computing device 115, 120 or 140 may also include or be referred to by those skilled in the art as a user device, a sensor, a smartphone, an iPod®, an iPad®, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. A local computing device 115, 120 and/or control panel 135 may include and/or be one or more sensors that sense: proximity, motion, temperatures, vibration, humidity, sound level or auditory input, smoke, structural features (e.g., glass breaking, window position, door position), time, geo-location data of a user and/or a device, distance, biometrics, weight, speed, height, size, preferences, light, darkness, weather, time, system performance, facial features, and/or other inputs that relate to a home automation system. A local computing device 115, 120 may be able to communicate through one or more wired and/or wireless communication links 145 with various components such as control panels, base stations, and/or network equipment (e.g., servers, wireless communication points, etc.) and/or the like.

The communication links 145 shown in home automation system 100 may include uplink (UL) transmissions from a local computing device 115, 120 to a control panel 135, and/or downlink (DL) transmissions from a control panel 135 to a local computing device 115, 120. The downlink transmissions may also be called forward link transmissions while the uplink transmissions may also be called reverse link transmissions. Each communication link 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 145 may transmit bidirectional communications and/or unidirectional communications. Communication links 145 may include one or more connections, including but not limited to, 345 MHz, Wi-Fi, Bluetooth, cellular, Z Wave, 802.11, peer-to-peer, LAN, WLAN, Ethernet, fire wire, fiber optic, and/or other connection types related to home automation systems.

In some embodiments of home automation system 100, control panel 135 and/or local computing devices 115, 120 may include one or more antennas for employing antenna diversity schemes to improve communication quality and reliability between control panel 135 and local computing devices 115, 120. Additionally or alternatively, control panel 135 and/or local computing devices 115, 120 may employ multiple-input, multiple-output (MIMO) techniques that may take advantage of multi-path, mesh-type environments to transmit multiple spatial layers carrying the same or different coded data.

While the local computing devices 115, 120 may communicate with each other through the control panel 135 using communication links 145, each local computing device 115, 120 may also communicate directly with one or more other devices via one or more direct communication links 145. Two or more local computing devices 115, 120 may communicate via a direct communication link 145 when both devices 115, 120 are in the geographic coverage area or when one or neither devices 115, 120 is within the geographic coverage area. Examples of direct communication links 145 may include Wi-Fi Direct, Bluetooth, wired, and/or, and other P2P group connections. The devices 115, 120 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within home automation system 100.

In some embodiments, one or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 130. In alternate embodiments, the network 125 may be integrated with any one of the local computing device 115, 120, server 130, or remote computing device 140, such that separate components are not required. Additionally, in alternate embodiments, one or more sensor units 110 may be integrated with control panel 135, and/or control panel 135 may be integrated with local computing device 115, 120, such that separate components are not required.

The local computing devices 115, 120 and/or control panel 135 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 and/or control panel 135 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from one or more sensor units 110.

The processor of the local computing devices 115, 120 and/or control panel 135 may be operable to control operation of the output of the local computing devices 115, 120 and/or control panel 135. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smartphone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 and/or control panel 135 to the output.

The remote computing device 140 may be a computing entity operable to enable a remote user to monitor the output of the one or more sensor units 110, or to retrieve the automatically indexed video footage. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 130.

In some embodiments, the one or more sensor units 110 may be sensors configured to conduct periodic or ongoing automatic measurements related to recording users and activities in and around the home. In particular, the one or more sensor units 110 may be operable to collect video footage and/or audio footage, and may additionally be operable to detect user data and activity data accompanying the collected video footage and/or audio footage, such as user identity, motion data, location data, and the like. Each sensor unit 110 may be capable of sensing multiple parameters, or alternatively, separate sensor units 110 may monitor separate parameters. For example, one sensor unit 110 may be a video recording device, while another sensor unit 110 (or, in some embodiments, the same sensor unit 110) may be an audio recording device. In some embodiments, one or more sensor units 110 may additionally monitor alternate user and activity parameters, for example using location sensors, vibration sensors, occupancy sensors, motion sensors, facial recognition sensors, biosignature sensors, or the like.

In some embodiments, the one or more sensor units 110 may be separate from the control panel 135, and may be positioned at various locations throughout the home or property. In other embodiments, the one or more sensor units 110 may be integrated or collocated with home automation system components or home appliances or fixtures. For example, a sensor unit 110 may be integrated with a wall outlet or switch. In still other embodiments, the one or more sensor units 110 may be integrated or collocated with the control panel 135 itself.

Data and video footage gathered by the one or more sensor units 110 may be communicated to local computing device 115, 120, which may be, in some embodiments, a control panel or other wall-mounted input/output home automation system display. In other embodiments, local computing device 115, 120 may be a personal computer or smartphone. Where local computing device 115, 120 is a smartphone, the smartphone may have a dedicated application directed to collecting and displaying video footage. The local computing device 115, 120 may process the video footage received from the one or more sensor units 110 by automatically identifying at least one distinguishing feature in the footage and indexing the footage accordingly. The indexed video footage may then be stored and presented for viewing by the user at the control panel 135, local computing device 115, 120, and/or remote computing device 140, or may be stored at server 130. In alternate embodiments, remote computing device 140 may process the data and video footage received from the one or more sensor units 110, via network 125 and server 130, to provide indexed video clips for user viewing. Data transmission may occur via, for example, frequencies appropriate for a personal area network (such as Bluetooth or IR communications) or local or wide area network frequencies such as radio frequencies specified by the IEEE 802.15.4 standard.

In some embodiments, local computing device 115, 120 may communicate with remote computing device 140 or control panel 135 via network 125 and server 130. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 130 may be configured to communicate with the sensor units 110, the local computing devices 115, 120, the remote computing device 140 and control panel 135. The server 130 may perform additional processing on signals received from the one or more sensor units 110 or local computing devices 115, 120, or may simply forward the received information to the remote computing device 140 and control panel 135.

Server 130 may be a computing device operable to receive data streams (e.g., from one or more sensor units 110 and/or local computing device 115, 120 or remote computing device 140), store and/or process data, and/or transmit data and/or data summaries (e.g., to remote computing device 140). For example, server 130 may receive a stream of user activity data based on motion detection from a sensor unit 110, a stream of video footage from the same or a different sensor unit 110, and a stream of audio data from the same or yet another sensor unit 110. In some embodiments, server 130 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database (e.g., in memory) containing video footage and user or activity data received from the sensor units 110 and/or the local computing devices 115, 120. Additionally, as described in further detail herein, software (e.g., stored in memory) may be executed on a processor of the server 130. Such software (executed on the processor) may be operable to cause the server 130 to monitor, process, summarize, present, and/or send a signal associated with the indexed video footage.

Figure 2:
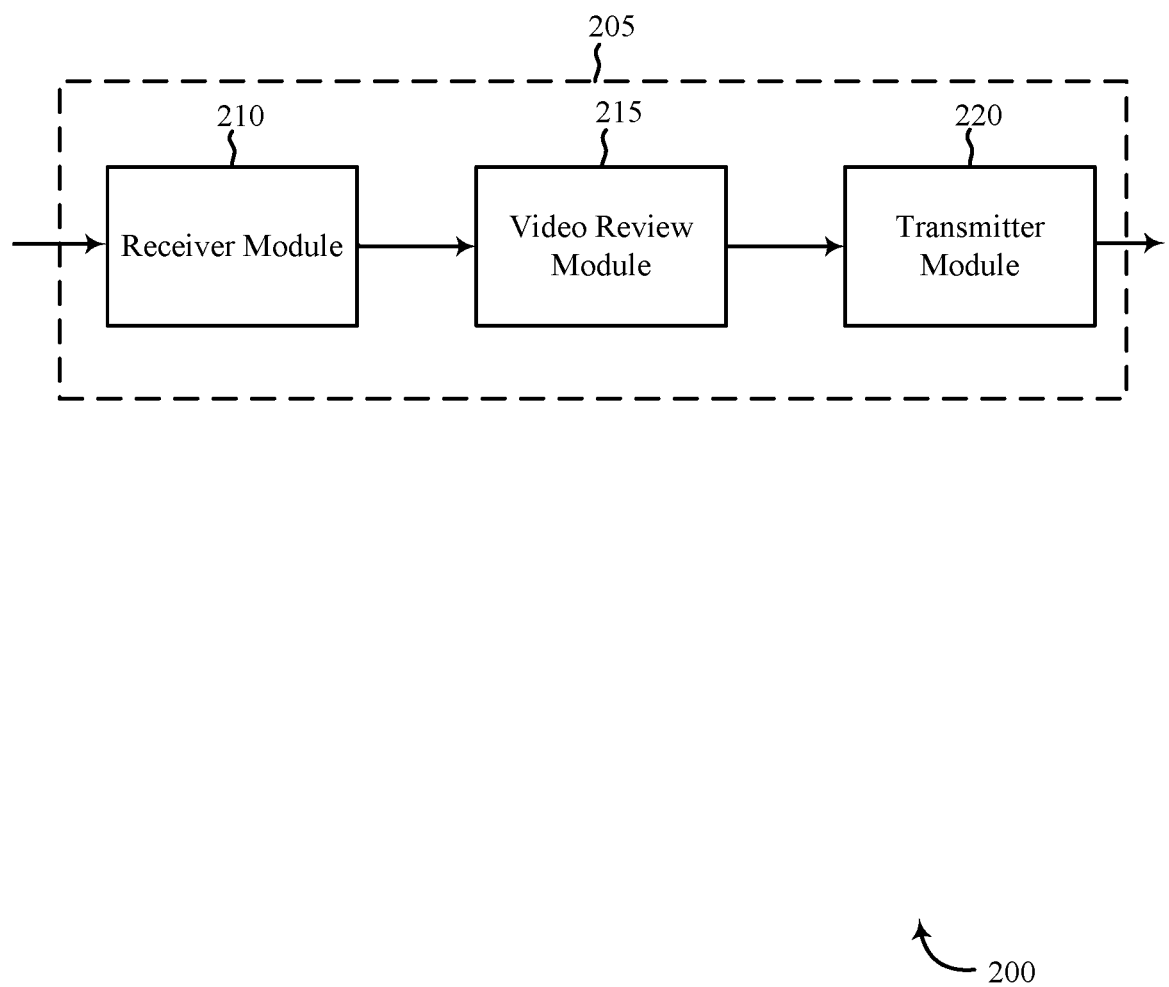
FIG. 2 shows a block diagram of a device relating to a security and/or automation system, in accordance with various aspects of this disclosure.

FIG. 2 shows a block diagram 200 of an apparatus 205 for use in a security and/or automation system, in accordance with various aspects of this disclosure. The apparatus 205 may be an example of one or more aspects of a control panel 135, or in other embodiments may be an example of one or more aspects of the one or more sensor units 110, or in still other embodiments may be an example of one or more aspects of the local computing device 115, 120 or remote computing device 140, each of which are described with reference to FIG. 1. The apparatus 205 may include any of a receiver module 210, a video review module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive a plurality of video footage from the one or more sensor units, which may be any of a video recorder, audio recorder, or a combination thereof. The receiver module 210 may be further configured to receive additional user and/or activity data from the one or more sensor units, such as the identity of the recorded user, the location of the recorded user, motion data for the user, or the like.

In some embodiments, the receiver module 210 may be additionally configured to receive inputted user preferences regarding one or more distinguishing features to be identified in the recorded video footage. For example, a parent may input at a control panel or in a dedicated application on a smartphone preferences relating to video footage containing recordings of their children, such that the system may identify clips containing the identified children and may index the video footage containing those recordings accordingly. In another example, a user may input at the control panel or on a smartphone preferences relating to audio recordings that detect music, such that the user can, for example, view clips showing home occupants practicing piano or singing. The system may accordingly identify clips containing the specified audio recordings, and may index the video footage containing those clips accordingly. In some embodiments, the inputted user preferences may be utilized to review and index previously recorded video footage, or additionally or alternatively, the inputted user preferences may be utilized to identify distinguishing features in later recorded video footage.

Where apparatus 205 is one or more sensor units, the monitored video footage, the activity data, and/or the user data may be collected locally at the apparatus 205 and received by the receiver module 210. In embodiments in which a user inputs preferences regarding one or more distinguishing features in the recorded video footage, the preferences may be inputted at any of a control panel, local computing device, or remote computing device, and may be subsequently communicated, for example via wired or wireless communication links, to apparatus 205 at receiver module 210. In other embodiments, where apparatus 205 is any of a control panel, local computing device, or remote computing device, the video footage, activity data, and/or user data may be monitored at the one or more sensor units and may be communicated to the apparatus 205 at receiver module 210. Additionally, any user inputted preferences regarding one or more distinguishing features in the recorded video footage may be locally received at the apparatus 205.

Any of the received plurality of video footage, activity data, user data, and/or inputted user preferences may be communicated from the receiver module 210 to the video review module 215. Video review module 215 may be operable to review the plurality of received video footage, along with any accompanying activity data, user data, and/or inputted user preferences, and automatically identify at least one distinguishing feature in the video footage recorded over a predetermined period of time. For example, video review module 215 may review video footage recorded over one day, one week, one month, or the like. Using, for example, motion detection data received via one or more sensor units at receiver module 210, video review module 215 may sort "action" clips from "non-action" clips among the video footage, the latter including, for example, video recordings of empty rooms, or of occupants sitting still or sleeping.

Video review module 215 may further review the remaining footage containing "action" clips and identify at least one distinguishing feature. For example, video review module 215 may detect, using user data collected by one or more sensor units over the course of a month, that the majority of video footage collected contains four or less occupants, but that in a few select scenes, the video footage contains ten occupants. Video review module 215 may automatically infer, based on the video footage collected over that month, that the footage containing the ten people was recorded during a special event or party, and should be indexed for later user viewing. In another example, video review module 215 may detect, using activity data collected by one or more sensor units, that the majority of video footage contains very little movement, but that in a few select scenes, the video footage contains a marked increase in detected motion. Video review module 215 may automatically infer, based on the video footage collected over the preceding month, that the footage containing a marked increase in user movement was recorded during a period of interest, for example when the home occupants were playing or dancing, and should be indexed for later user viewing. Other embodiments may include any other noticeable distinguishing feature identified over the predetermined period, including, but not limited to, increased or unusual audio, vibration, temperature, lighting, facial expressions, temporal data, and the like. As discussed in more detail below, video review module 215 may accordingly index the identified video clips "of interest" for user viewing, for example by storing the video clips as thumbnails or as a "storyboard."

The identified and indexed video footage may then be communicated from video review module 215 to transmitter module 220, which may communicate the indexed video footage to the user or to storage. For example, video review module 215 may identify a length of video containing unusual audio, such as users singing, and may communicate the indexed clip of the users singing, via transmitter module 220, to the user at his smartphone. In some embodiments, the indexed clip may be sent individually, while in other embodiments, the indexed clip may be combined with other indexed clips containing common distinguishing features, for example any clips containing a particular identified user, clips recorded in a particular room or on a particular day, clips containing a particular identified activity, and the like. In some embodiments, the indexed clip or group of indexed clips may be communicated with accompanying pertinent information collected at receiver module 210 from one or more sensor units, such as the identity of the users in the clip, the time and location of the recording of the users, and the like.

In other embodiments, instead of or in addition to communicating the indexed video clips to the user, transmitter module 220 may communicate the indexed clips to the server 130 for storage and/or processing. For example, a plurality of indexed video clips may be communicated to server 130, which may compile the clips according to commonly identified distinguishing features, and may store for later viewing by the user.

In still other embodiments, for example where apparatus 205 is a control panel, transmitter module 220 may communicate the indexed video clips locally to be displayed at or projected by the control panel. The indexed video clips may be accessible by the user at the control panel by inputting a request to view the clips, or in some embodiments may be displayed or projected automatically, for example upon detecting approach of an identified user to the control panel via one or more sensor units.

Figure 3:
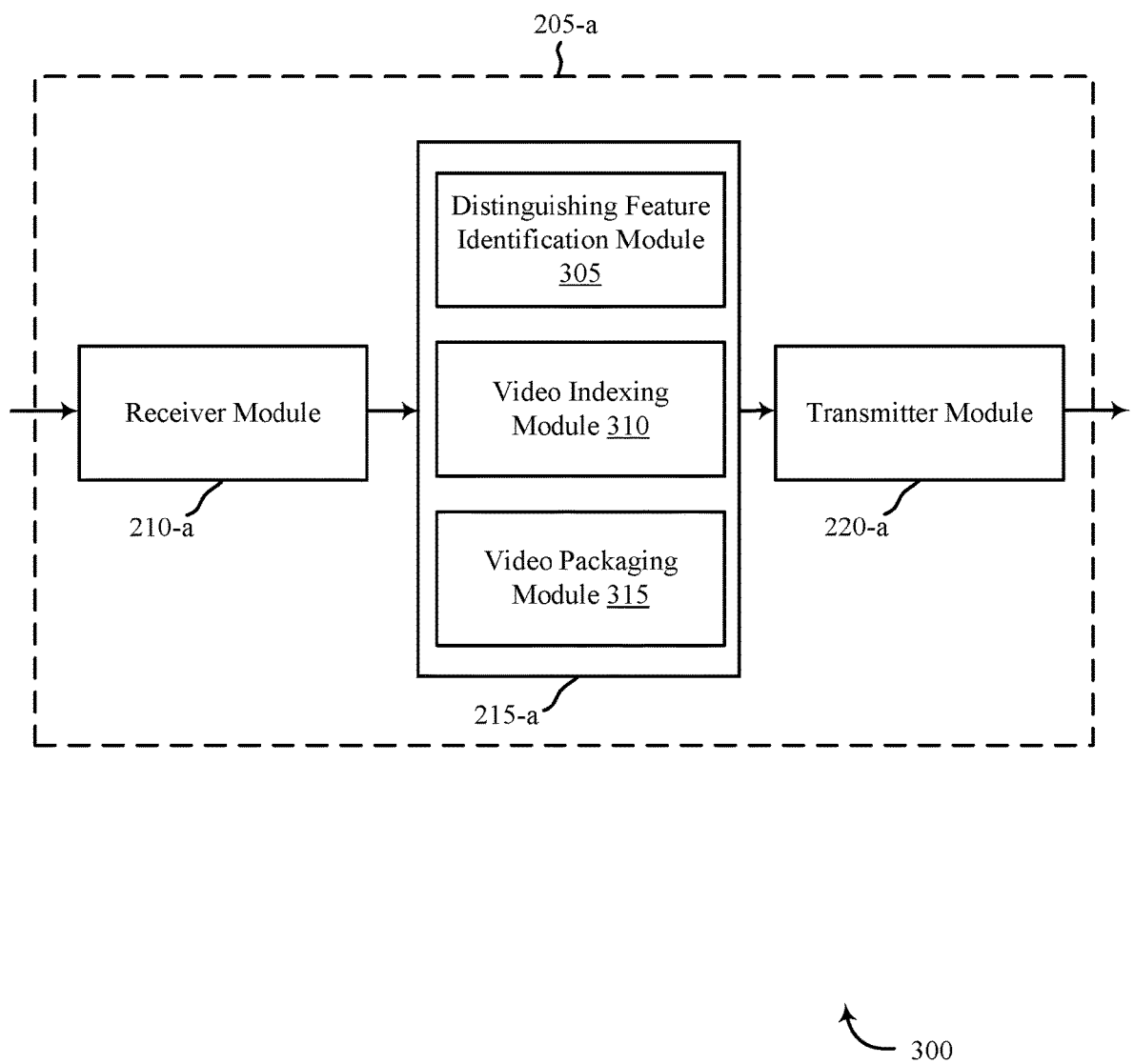
FIG. 3 shows a block diagram of a device relating to a security and/or automation system, in accordance with various aspects of this disclosure.

In FIG. 3, apparatus 205-a may be an example of apparatus 205 illustrated in FIG. 2. Apparatus 205-a may comprise any of a receiver module 210-a, a video review module 215-a, and/or a transmitter module 220-a, each of which may be examples of the receiver module 210, the video review module 215, and the transmitter module 220 as illustrated in FIG. 2. Apparatus 205-a may further comprise, as a component of the video review module 215-a, any of a distinguishing feature identification module 305, a video indexing module 310, or a video packaging module 315, or a combination thereof.

The components of apparatus 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

As previously discussed, apparatus 205-a may be any of a control panel, a local computing device, a remote computing device, or one or more sensor unit. Receiver module 210-a may operate as described with respect to FIG. 2. For example, where apparatus 205-a is a control panel, receiver module 210-a may receive monitored video footage, activity data, and/or user data via one or more sensor units, and in some embodiments may receive user inputted preferences directly at apparatus 205-a or via a local or remote computing device. In other examples, where apparatus 205-a is one or more sensor units, receiver module 210-a may receive monitored video footage, activity data, and/or user data directly.

Video review module 215-a may similarly operate as described with respect to FIG. 2. In particular, video review module 215-a may comprise a distinguishing feature identification module 305, a video indexing module 310, and/or a video packaging module 315. The distinguishing feature identification module 305 may be operable to review the plurality of received video footage, along with any accompanying activity data, user data, and/or inputted user preferences from the receiver module 210-a, and may automatically identify at least one distinguishing feature in the video footage recorded over a predetermined period of time.

For example, receiver module 210-a may communicate to distinguishing feature identification module 305 a plurality of video footage recorded over the course of a week. Distinguishing feature identification module 305 may automatically review the received video footage to identify one or more distinguishing features recorded during that time. For example, distinguishing feature identification module 305 may detect that the majority of the recorded video footage shows the family dog walking past the camera or sleeping, but that in select clips, the video footage shows the dog running, barking, or playing, as detected, for example, by one or more sensors detecting motion, audio, vibration, and the like. Distinguishing feature identification module 305 may identify these "action" clips as containing a distinguishing feature, namely, a "dog at play," and may accordingly communicate these "dog at play" clips to the video indexing module 310. In some embodiments, user inputted preferences may be taken into account by distinguishing feature identification module 305 in identifying one or more distinguishing features in the received video footage. For example, where a user has inputted a preference for clips containing laughter, distinguishing feature identification module 305 may "look" for clips among the plurality of video footage containing laughter, detected, for example, by one or more sensor units having motion, audio, or facial recognition detectors, or the like. In this way, distinguishing feature identification module 305 may be operable to index clips containing a particular feature according to user preferences, even where that feature is not necessarily unique among the plurality of received video footage as compared with other identified features.

Video indexing module 310 may receive clips of video footage from the distinguishing feature identification module 305, where the received clips have been identified by the distinguishing feature identification module 305 as containing one or more distinguishing feature. Video indexing module 310 may additionally receive data accompanying the clips of video footage, such as user identity and activity data collected at receiver module 210-a from one or more sensor units. Video indexing module 310 may accordingly associate the received user and activity data with the received video footage clips, and may compile and index the clips in various manners. For example, video indexing module 310 may group a plurality of clips containing the same user, clips recorded on the same day, or clips containing the same activity, or a combination thereof. In the above provided example, video indexing module 310 may receive the "dog at play" clips from the distinguishing feature identification module 305, and may group all clips containing the "dog at play" distinguishing feature into a single indexed group, for example including the dog's name as an indexing label. The grouped clips may then be packaged by the video packaging module 315 for presentation to the user.

Video packaging module 315 may receive the indexed video footage from video indexing module 310, and may package the indexed video footage in one or more formats for communication and presentation to the user. In some embodiments, the indexed video footage may be packaged into any of thumbnails, clips, single-cut videos, or still photographs, or a combination thereof. For example, indexed video footage containing clips of the family dog may be packaged into thumbnails showing the "most exciting" portion of each clip on the thumbnail, which the user may then select in order to view the clip in its entirety. The "most exciting" portion of the clip may be determined by distinguishing feature identification module 305, for example by associating received activity data, such as motion, vibration, audio, or the like, from the one or more sensor units via receiver module 210-a. In other embodiments, the individual indexed video footage may be compiled at video packaging module 315 into a single-cut video, such that the user may view the plurality of "interesting" clips from the previous week in one continuous video. In still other embodiments, the individual indexed video footage may be compiled at video packaging module 315 into a "storyboard," showing a compilation of thumbnails or still photographs of the "most exciting" portions of each clip to tell a "story," for example, of the family dog's activities over the course of the week or other predetermined period of time.

Indexed video footage packaged at video packaging module 315 may then be communicated as packaged video to transmitter module 220-a for communication to the user. In embodiments where apparatus 205-a is a control panel, local computing device, or remote computing device, the packaged video may be transmitted locally by transmitter module 220-a for display or projection at the apparatus 205-a. In other embodiments, where apparatus 205-a is one or more sensor unit, transmitter module 220-a may communicate the packaged video to any one or more of a control panel, local computing device, or remote computing device for viewing by the user. In still other embodiments, transmitter module 220-a may communicate the packaged video to a server for storage until such time as the user inputs a viewing instruction at, for example, his smartphone or the control panel. Where the packaged video is communicated by transmitter module 220-a to a local or remote computing device, the local or remote computing device may receive the packaged video as any of an email or SMS, or in other embodiments may receive the packaged video at a dedicated application on a smartphone or personal computer for selective display based on user input at the device, as discussed in more detail below with respect to FIG. 8.

Figure 4:
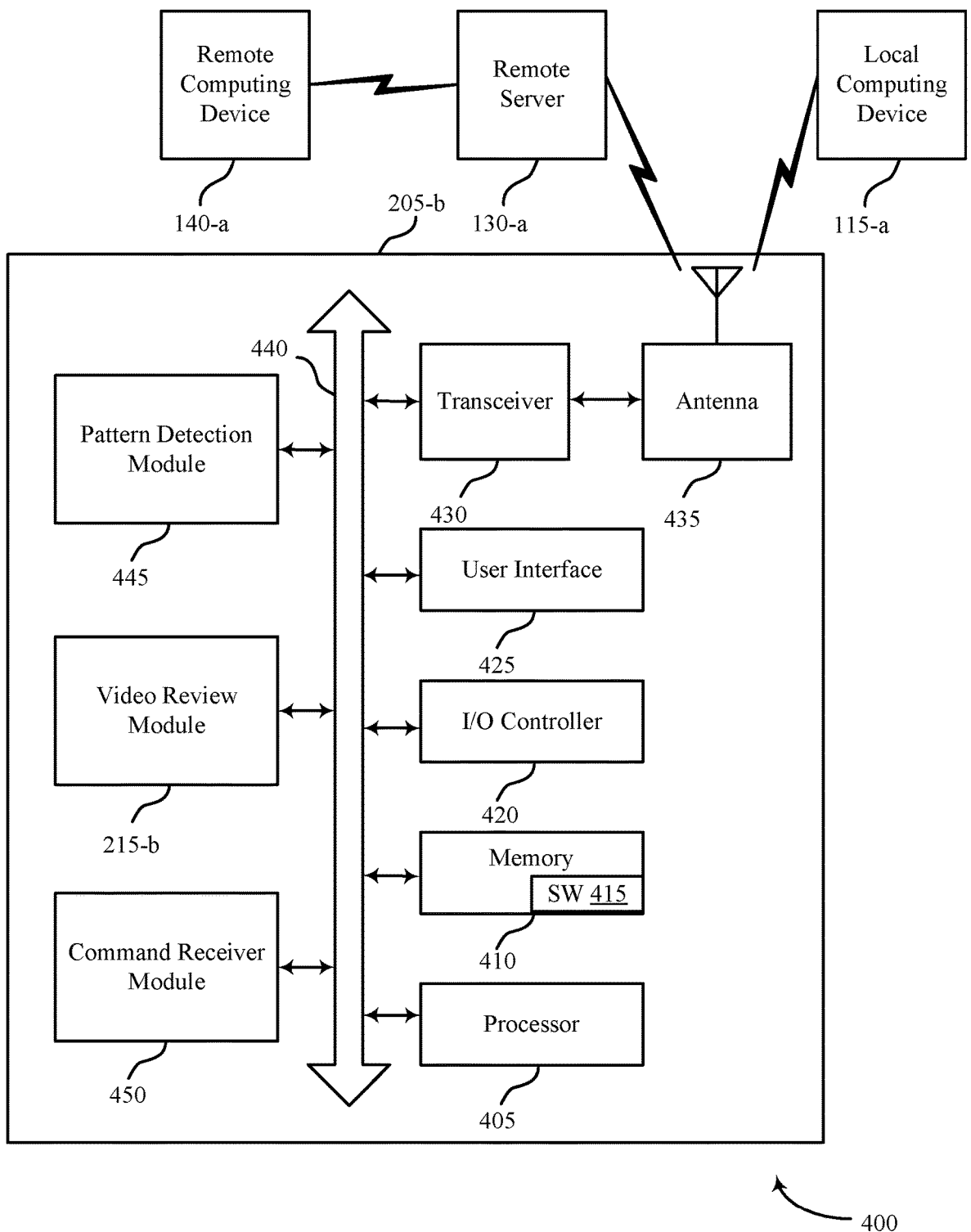
FIG. 4 shows a block diagram relating to a security and/or automation system, in accordance with various aspects of this disclosure.

FIG. 4 shows a system 400 for use in receiving a plurality of video footage and indexing the video footage based on identifying at least one distinguishing feature in the footage, in accordance with various examples. System 400 may include an apparatus 205-b, which may be an example of the control panel 135 of FIG. 1. Apparatus 205-b may also be an example of one or more aspects of apparatus 205 and/or 205-a of FIGS. 2 and 3.

Apparatus 205-b may include a video review module 215-b, which may be an example of the video review module 215, 215-a described with reference to FIGS. 2 and 3. Apparatus 205-b may also include components for detecting a pattern among received user preferences, and components for receiving user commands. For example, pattern detection module 445 may be operable to detect, based on user inputted preferences, that the user wants to see video footage containing clips of Sally practicing piano. The pattern detection module 445 may accordingly index all clips from the received plurality of video footage containing clips of Sally practicing piano, and may further index clips of video footage containing other users in the household playing piano, on the inference that the user would also wish to see such clips. The pattern detection module 445 may identify other clips containing other users playing piano, for example, by receiving data from one or more sensor units indicating common audio, vibration, motion, location, or the like.

Apparatus 205-b may further include a command receiver module 450, operable to receive user commands relating to video footage indexing preferences. For example, a user sitting in his living room with his family may see his baby roll over for the first time, and may speak aloud the command, "Vivint, record this," or some other suitable audio command. In another example, the user may make a hand or body gesture captured by a motion detector. Command receiver module 450 may receive the audio or gestural command via, for example, one or more sensor units comprising a microphone or motion detector, and may derive an action instruction based on the command to index the video footage containing clips from that moment. In order to encompass the entirety of the event, command receiver module 450 may derive an action instruction to index video footage 15 seconds before and 15 seconds after the moment when the user command was received. In other embodiments, the time frame may be longer or shorter. In still other embodiments, the video review module 215-*b* may detect the length of the relevant portion of the video footage based on received activity data from the one or more sensor units, for example including motion data, or the like, such that the clip starts and ends only when the "action" starts and ends. In this way, users may ensure that particular moments of importance are properly captured and indexed by the system, such that the important moments are not lost, as they may be if, for example, the user had to run for a video camera.

Apparatus 205-*b* may also include components for bi-directional data communications including components for transmitting communications and components for receiving communications. For example, apparatus 205-*b* may communicate indexed video footage bi-directionally with one or more of a local computing device 115-*a*, a remote server 130-*a*, and/or a remote computing device 140-*a*. This bi-directional communication may be direct (e.g., apparatus 205-*b* communicating directly with local computing device 115-*a*) or indirect (e.g., apparatus 205-*b* communicating with remote computing device 140-*a* via remote server 130-*a*). Remote server 130-*a*, remote computing device 140-*a*, and local computing device 115-*a* may be examples of remote server 130, remote computing device 140, and local computing device 115, 120 as shown with respect to FIG. 1.

As previously discussed, the video review module 215-*b* be operable to review the plurality of received video footage, along with any accompanying activity data, user data, and/or inputted user preferences, and automatically identify at least one distinguishing feature in the video footage recorded over a predetermined period of time. For example, video review module 215-*b* may collect video footage recorded over one day, one week, one month, or the like. Using, for example, motion detection data received via one or more sensor units at a receiver module, video review module 215-*b* may sort "action" clips from "non-action" clips, the latter including, for example, video recordings of empty rooms, or of occupants sitting still or sleeping. Video review module 215 may further review the remaining footage containing "action" clips and identify at least one distinguishing feature, such as a particular user or entity, activity, date, expression, audio, or the like.

Apparatus 205-*b* may also include a processor module 405, a memory 410 (including software (SW) 415), an input/output controller module 420, a user interface module 425, a transceiver module 430, and one or more antennas 435, each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of remote server 130-*a* or local computing device 115-*a*. The transceiver module 430 may include a modem to modulate the packets and provide the modulated packets to the one or more antennas 435 for transmission, and to demodulate packets received from the one or more antennas 435. While an apparatus comprising a control panel (e.g., 205-*b*) may include a single antenna 435, the apparatus may also have multiple antennas 435 capable of concurrently transmitting or receiving multiple wired and/or wireless transmissions. In some embodiments, one element of apparatus 205-*b* (e.g., one or more antennas 435, transceiver module 430, etc.) may provide a direct connection to a remote server 130-*a* via a direct network link to the Internet via a POP (point of presence). In some embodiments, one element of apparatus 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 435 and/or transceiver module 430 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 435 may receive signals or information specific and/or exclusive to itself. In other embodiments each antenna 435 may receive signals or information neither specific nor exclusive to itself.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., receive a plurality of video footage, review the plurality of video footage to identify at least one distinguishing feature, index the video footage based on the at least one distinguishing feature, etc.). Alternatively, the software/firmware code 415 may not be directly executable by the processor module 405 but may cause a computer (e.g., when compiled and executed) to perform functions described herein.

In some embodiments the processor module 405 may include, among other things, an intelligent hardware device (e.g., a central processing unit (CPU), a microcontroller, and/or an ASIC, etc.). The memory 410 may contain, among other things, the Basic Input-Output system (BIOS) which may control basic hardware and/or software operation such as the interaction with peripheral components or devices. For example, the video review module 215-*b* may be stored within the system memory 410. Applications resident with system 400 are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver module 430, one or more antennas 435, etc.).

Many other devices and/or subsystems may be connected to, or may be included as, one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and is not discussed in detail in this disclosure. Code to implement the present disclosure may be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The components of the apparatus 205-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 5:
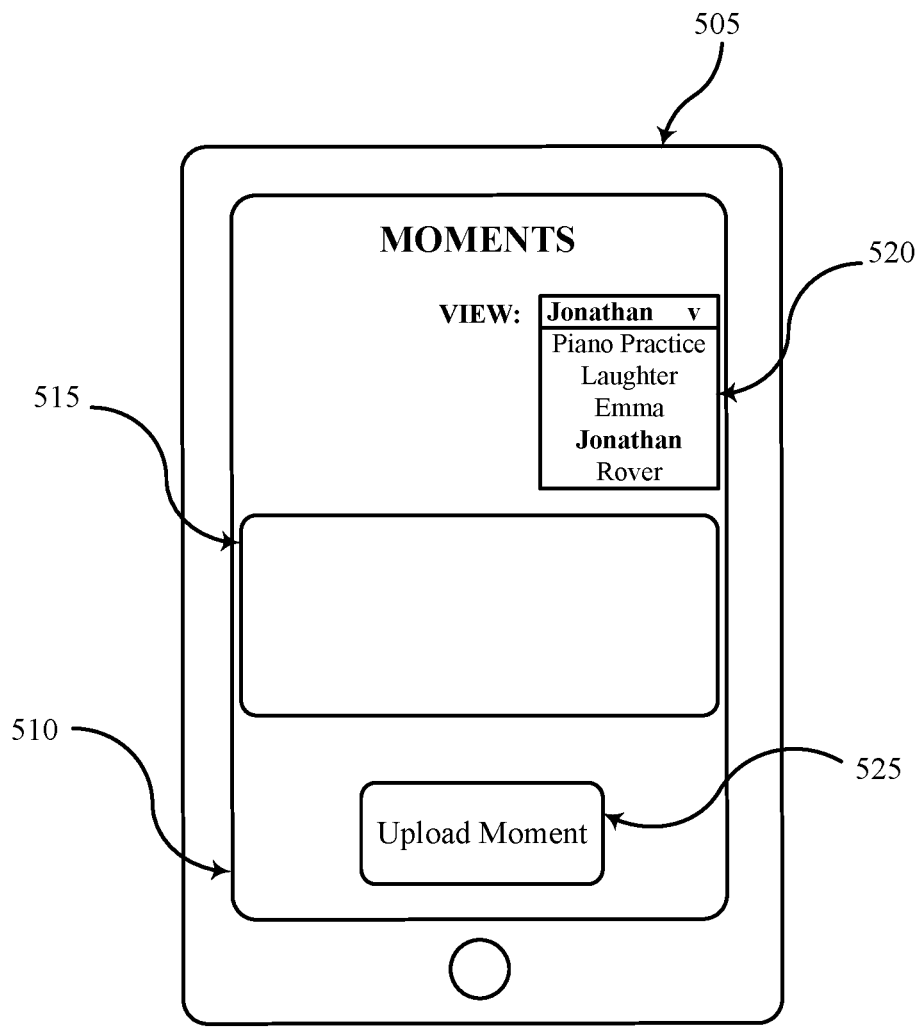
FIG. 5 shows a block diagram relating to a security and/or automation system, in accordance with various aspects of this disclosure.

FIG. 5 is a block diagram 500 showing one embodiment of a display screen 510 for use in allowing a user to review indexed video footage. In one embodiment, an apparatus 505 shown may be any of a local computing device or a remote computing device, such as a smartphone, tablet, or personal computer, or a control panel mounted on a wall or placed on a table or counter. The apparatus 505 may be an example of the control panel 135 of FIG. 1. Apparatus 505 may also be an example of one or more aspects of apparatus 205 of FIGS. 2, 3, and/or 4. In embodiments where apparatus 505 is a smartphone, tablet, or personal computer, the indexed video footage may be viewable on a dedicated application on the computing device. In embodiments where apparatus 505 is a control panel, the indexed video footage may be viewable on a display screen on the control panel, or alternatively or in addition, may be viewable as a projected display from the control panel, for example onto an adjacent wall, floor, or ceiling.

The display screen 510 of apparatus 505 may display a variety of information pertinent to indexed video footage. For example, display screen 510 may include an image 515 representing the indexed video footage, a viewing selection menu 520 for selecting indexed video footage to view, and a video uploading selection box 525 for sharing the indexed video footage.

In some embodiments, the video footage may be displayed on display screen 510 as a still photograph or thumbnail image 515, which may be selected by the user to enlarge and/or play the indexed video footage. In other embodiments, display screen 510 may present indexed video footage as a series of thumbnail images 515, or as a storyboard or other suitable display format. In embodiments where the indexed video footage is projected from a control panel, the display screen 510 may not include an image 515, or may include a selectable image 515 which may then be projected.

The display screen 510 may further comprise a viewing selection menu 520 to allow the user to select indexed video footage based on identified distinguishing features in the indexed video footage. In the illustrated example, various identified distinguishing features may include activities (playing piano), identified audio or facial expressions (laughter), identified home occupants (Emma and Jonathan), and identified pets (Rover). The various distinguishing features may be identified as previously discussed, in particular by utilizing activity and/or user data received from one or more sensor units in conjunction with a plurality of received video footage. In some embodiments, the identified distinguishing features may be automatically detected by the home automation system, and in other embodiments the identified distinguishing features may be identified based, at least in part, on received user preferences. In this example, using the drop-down viewing selection menu 520, the user may select the distinguishing feature he wishes to view; in this case, the viewer has elected to view indexed video footage containing his son, Jonathan. Upon selection in the viewing selection menu 520, the appropriate one or more video clips containing Jonathan may be displayed in image 515 as any of thumbnails, clips, single-cut videos, still photographs, or a storyboard, or a combination thereof.

In some embodiments, the video uploading selection box 525 may further comprise an "upload moment" option, allowing the user to share the selected one or more video clips via any acceptable wired or wireless communication means, such as email or SMS, or using social media. In this way, the user may quickly and easily gain access to the indexed video footage stored at, for example, a remote processor, and may view and share selected clips.

Figure 6:
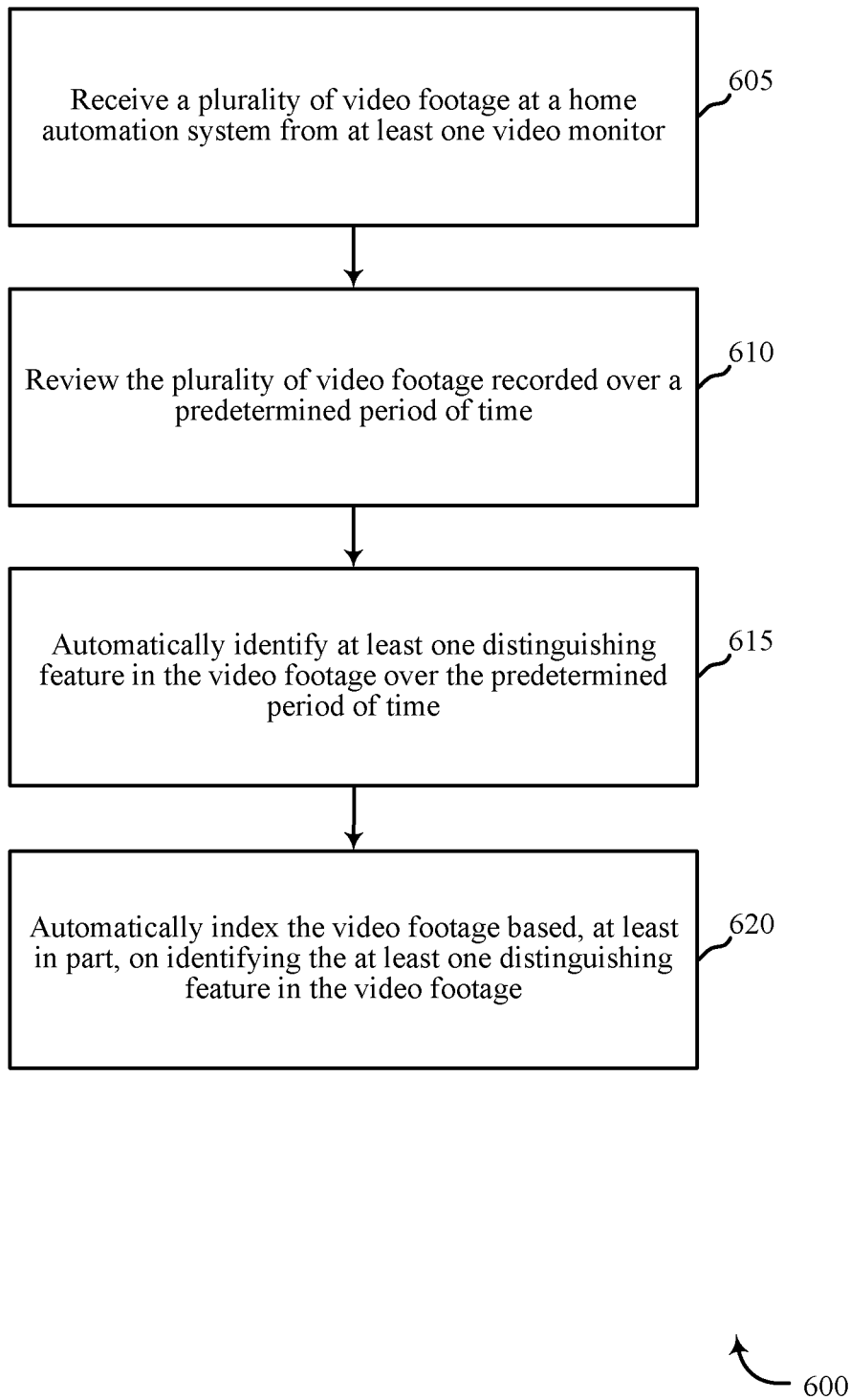
FIG. 6 is a flow chart illustrating an example of a method relating to a security and/or automation system, in accordance with various aspects of this disclosure.

FIG. 6 is a flow chart illustrating an example of a method 600 for a security and/or automation system, in accordance with various embodiments. For clarity, the method 600 is described below with reference to aspects of one or more of the sensor units 110, local computing device 115, 120, control panel 135, and/or remote computing device 140 described with reference to FIGS. 1-4, and/or aspects of one or more of the apparatus 205, 205-a, or 205-b described with reference to FIGS. 2-4, and/or aspects of the apparatus 505 with reference to FIG. 5. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 605, the method 600 may include receiving a plurality of video footage at a home automation system from at least one video monitor. For example, video footage may be received from multiple video cameras positioned throughout the interior of the home, as well as one or more video cameras mounted outside the home. The video cameras may be continuously operated in some embodiments, while in other embodiments the video cameras may record at predetermined intervals or in response to a trigger, such as detected light, motion, or audio, or a combination thereof. In some embodiments, video footage received from a plurality of video monitors may include visual footage from one or more monitors, and audio footage from the same or separate one or more monitors.

At block 610, the method 600 may include reviewing the plurality of video footage recorded over a predetermined period of time. For example, the home automation system may review video footage recorded over the period of a day, a week, a month, or any other acceptable period of time. In some embodiments, the period of time reviewed may vary based on the activity detected over that period of time. For example, where the home automation system reviews video footage over the previous day only to find that the home was unoccupied during the entirety of that day, the home automation system may then review video footage recorded over the previous two days, or so on, until activity is detected. Thus, where a family goes out of town, for example, and the home is unoccupied, the system may pass over or discard of empty, "non-action" footage. The period of review may be selected based on predetermined parameters, or may be selected automatically by the system based on monitored activity.

At block 615, the method 600 may include automatically identifying at least one distinguishing feature in the video footage over the predetermined period of time. As previously discussed, by reviewing the plurality of video footage over the predetermined period of time, the system may identify clips of video footage containing unusual or distinguishing features among the plurality of video footage, such as unique audio, visual, location, occupancy, heart rate, vibration, motion, user identity, or other data. This data may be received as activity data and/or user data gathered from one or more sensor units. For example, the system may identify that, over the previous week, several instances of increased vibration were detected by one or more sensor units. The accompanying video footage from these periods of increased vibration may therefore be automatically flagged by the system as containing distinguishing features, where the distinguishing feature may perhaps be the result of members of the household dancing or playing in the home. In other embodiments, the system may identify distinguishing features based on temporal data. For example, the system may detect, via any of user input, accessed user digital calendars, or the like, that one day in the reviewed predetermined period of time was a particular user's birthday or was a holiday. The system may accordingly flag video footage recorded on that day as containing a distinguishing feature, where the distinguishing feature is a special event.

At block 620, the method 600 may include automatically indexing the video footage based, at least in part, on identifying the at least one distinguishing feature in the video footage. In some embodiments, automatically indexing the video footage may include identifying a plurality of individual clips of the video footage that include an identified common distinguishing feature. For example, the system may detect at block 615 a distinguishing feature of increased vibration. The system may accordingly, at block 620, index all clips containing this identified distinguishing feature, perhaps including an indexing label of "dancing." In some embodiments, the indexed video footage may include a common activity, while in other embodiments, the indexed video footage may include commonly identified users, locations, times, or the like. The reviewed plurality of video footage may be indexed according to one common distinguishing feature, or may be indexed according to a plurality of distinguishing features, which may or may not recur over the predetermined period of time. For example, the system may detect, via audio sensors, piano practice at multiple distinct times over the previous month, and may index the video footage accompanying this plurality of practicing sessions accordingly. In another example, the system may detect, via a motion sensor, increased pet motion on a single occasion over the prior month, and may index the video footage accompanying this single event accordingly.

This indexed video footage may then be packaged and stored or presented to the user for viewing. For example, as previously discussed, the indexed footage may be assembled into any of thumbnails, clips, single-cut videos, still photographs, or storyboards, or a combination thereof. The assembled indexed video footage may be viewable by one or more user at any of a control panel, local computing device, or remote computing device. Where the footage is viewed at a control panel, the footage may be displayed on or projected from the control panel either in response to user input triggering the display, or in some embodiments, upon detecting user approach at the control panel. Where the footage is viewed at a local or remote computing device, the footage may be viewed in a dedicated application, for example on a smartphone, personal computer, or tablet.

The operations at blocks 605, 610, 615, and 620 may be performed using the receiver module 210, 210-*a*, the video review module 215, 215-*a*, 215-*b*, the transmitter module 220, 220-*a*, a and/or the transceiver module 430, described with reference to FIGS. 2-4.

Thus, the method 600 may provide for video indexing methods relating to security and/or automation systems. It should be noted that the method 600 is just one implementation and that the operations of the method 600 may be rearranged or otherwise modified such that other implementations are possible.

Figure 7:
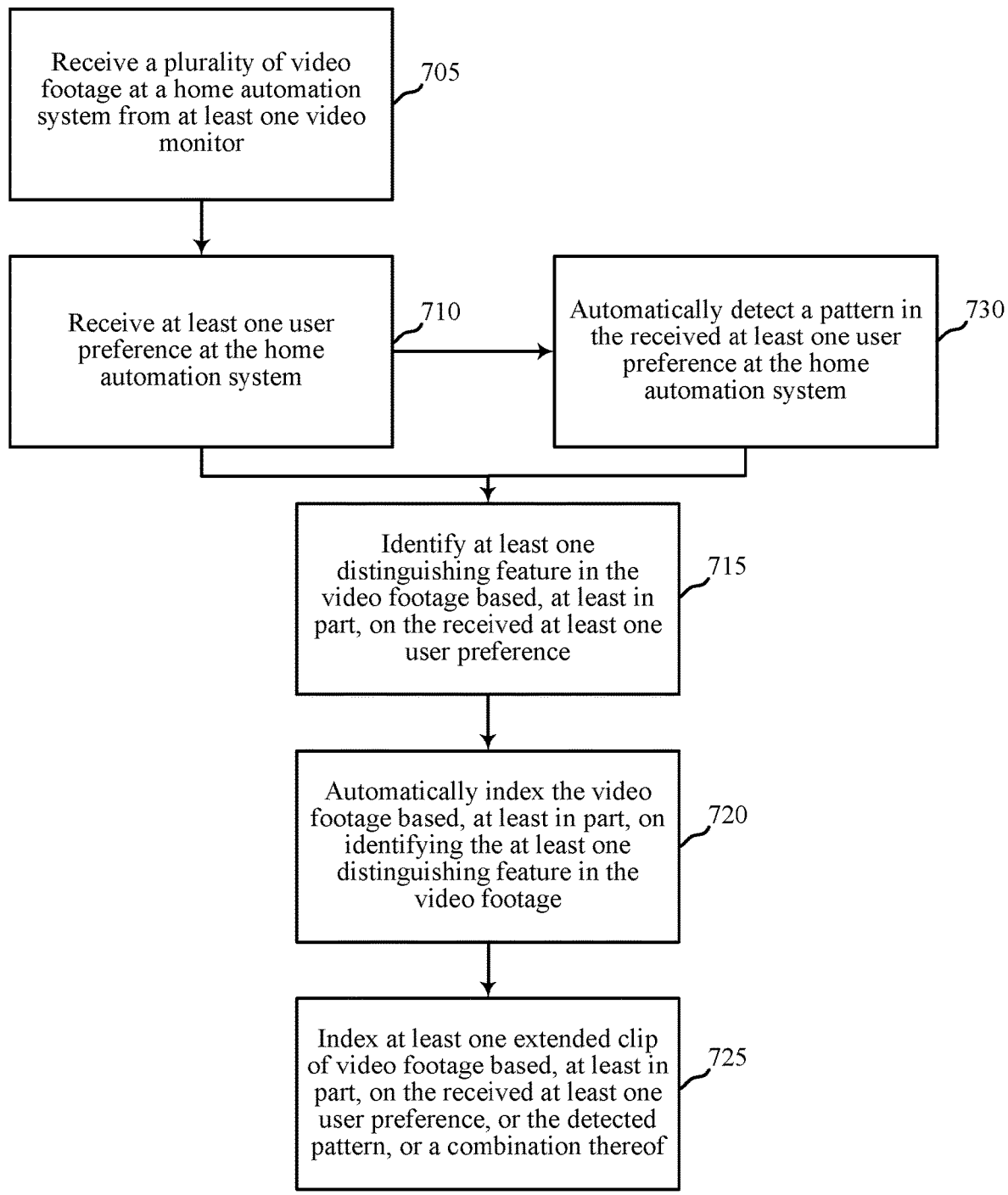
FIG. 7 is a flow chart illustrating an example of a method relating to a security and/or automation system, in accordance with various aspects of this disclosure.

FIG. 7 is a flowchart illustrating an example of a method 700 for identifying distinguishing features in a plurality of video footage, in accordance with various aspects of the present disclosure. For clarity, the method 700 is described below with reference to aspects of one or more of the sensor units 110, local computing device 115, 120, control panel 135, and/or remote computing device 140 described with reference to FIGS. 1-4, and/or aspects of one or more of the apparatus 205, 205-*a*, or 205-*b* described with reference to FIGS. 2-4, and/or aspects of the apparatus 505 with reference to FIG. 5. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 705, the method 700 may include receiving a plurality of video footage at a home automation system from at least one video monitor. As previously discussed, the plurality of video footage may be received from one or more interior or exterior video monitors, or a combination thereof, where the video monitors may comprise visual detection means, audio detection means, or both.

At block 710, the method 700 may include receiving at least one user preference at the home automation system. The user preference may relate to preferred distinguishing features among the plurality of video footage, which the user may want the system to index for later storage, compiling, and viewing. The preferred distinguishing features may include, for example, particular individuals, activities, locations, audio or visual data, temporal data, facial expressions, and the like, which are of interest to the user. For example, a user may indicate that he wants the system to index video footage containing clips of home occupants laughing, or any clips containing the user's dog in "action," as opposed to sleeping or walking by the one or more video monitors. User preferences may be inputted by the user at any of a control panel, local computing device, or remote computing device. Where the user inputs his preferences at a local or remote computing device, the device may comprise a dedicated application for receiving the user input.

At block 715, the method 700 may include identifying at least one distinguishing feature in the video footage based, at least in part, on the received at least one user preference. Thus, where the user has inputted a preference to index video footage containing laughter, the system may identify any clips containing the "laughing" distinguishing feature in the video footage recorded over a predetermined period of time. The "laughing" distinguishing feature may be identified, for example, via one or more sensors having audio detection operability, and all video footage corresponding to periods of time during which the one or more sensors detected "laughing" audio may be identified.

In some embodiments, the system may be operable to "learn" user preferences such that previously or future recorded video footage may be indexed according to identified distinguishing features that the system has inferred will be of interest to the user. At block 710, then, where the system has received at least one user preference, the method 700 may continue to block 730, which may include automatically detecting a pattern in the received at least one user preference at the home automation system. For example, the system may infer, based on the received user input at block 710 relating to indexing clips containing "laughing" as a distinguishing feature, that a user may also be interested in clips containing other indication of user fun or playing, such as dancing. In another example, the system may infer, from a combination of user input preferences, a user's interest in particular distinguishing features in the video footage. For example, a user may input at block 710 preferences that video footage containing the user's daughter, Sally, be indexed, and additionally that video footage containing users singing be indexed. At block 730, the system may accordingly infer that the user may additionally be interested in video footage containing Sally playing the piano, for example.

Once the system has detected a pattern in user preferences, at block 715, the method 700 may include identifying at least one distinguishing feature in the video footage based, at least in part, on the received at least one user preference. In this instance, the received at least one user preference may be the inferred user preference derived by the system as a result of detecting a pattern at block 730. Thus, the system may review the plurality of footage to identify those clips of video footage containing the desired one or more distinguishing features, such as home occupants laughing.

In either embodiment, whether the distinguishing feature has been identified solely based on received user preferences, or additionally based on a detected pattern in user preferences, at block 720, the method 700 may include automatically indexing the video footage based, at least in part, on identifying the at least one distinguishing feature in the video footage. Thus, those clips identified at block 715 as containing the "laughing" distinguishing feature may be indexed, where the indexing may include identifying a plurality of individual clips of the video footage that comprise the identified common distinguishing feature. In other examples, all video footage containing a particular user identified in the inputted references may be indexed together at block 720, and further any clips containing common distinguishing features identified in the user inputted preferences may similarly be indexed.

At block 725, the method 700 may include indexing at least one extended clip of video footage based, at least in part, on the received at least one user preference, or the detected pattern, or a combination thereof. In this way, the system may identify distinguishing features known or assumed to be of particular interest to the user, and may include extended clips of video footage containing such distinguishing features so as to ensure that the entirety of the event of interest is properly indexed. For example, a user may have inputted a preference for clips of video footage containing his baby. The system may accordingly index all those clips of video footage containing the baby, and may additionally extend the length of each indexed clip, for example by fifteen seconds on either end of the identified "action," to ensure that the entire moment, for example the baby walking for the first time, is indexed for later viewing by the user.

Thus, the method 700 may provide for indexing video footage according to received and derived user preferences in a security and/or automation system. It should be noted that the method 700 is just one implementation and that the operations of the method 700 may be rearranged or otherwise modified such that other implementations are possible.

Figure 8:
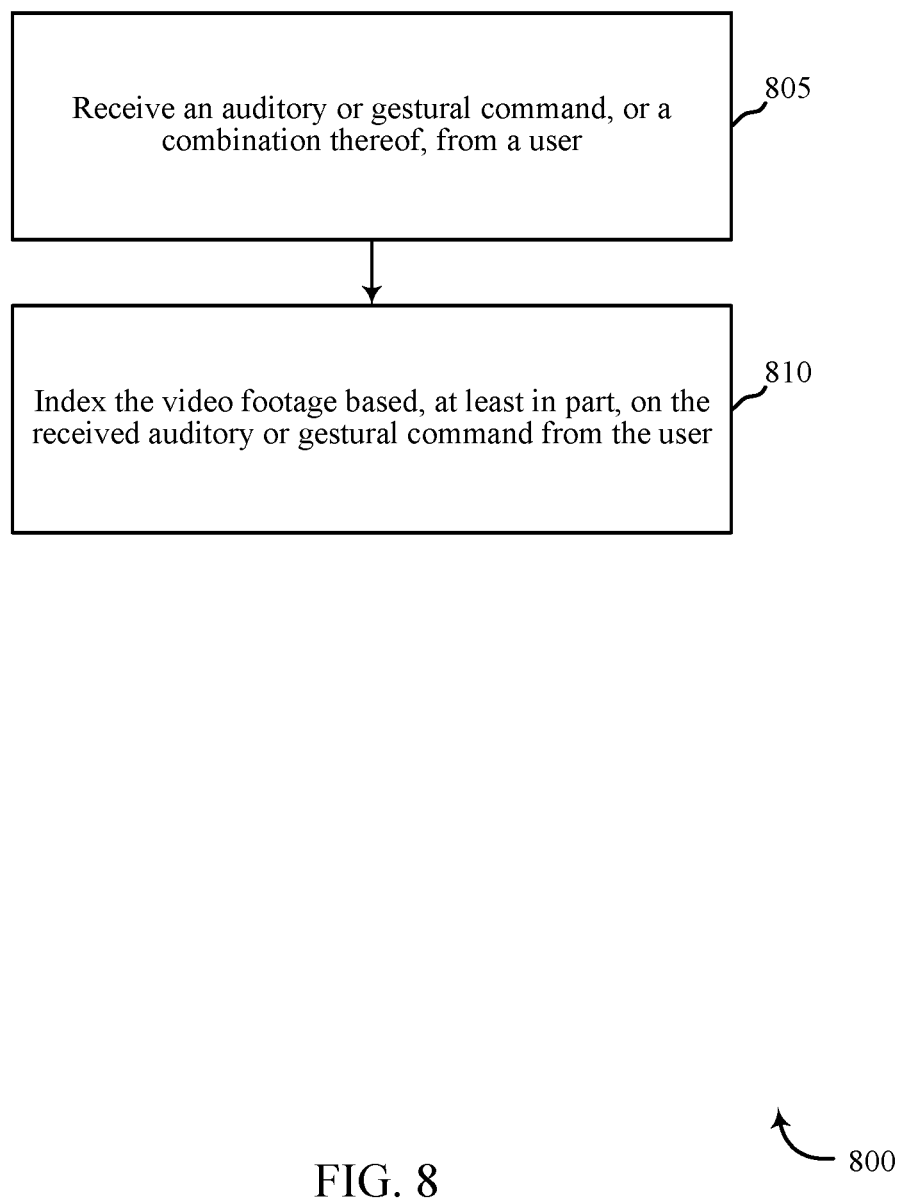
FIG. 8 is a flow chart illustrating an example of a method relating to a security and/or automation system, in accordance with various aspects of this disclosure.

FIG. 8 is a flowchart illustrating an example of a method 800 for indexing video footage in response to receiving a command, in accordance with various aspects of the present disclosure. For clarity, the method 800 is described below with reference to aspects of one or more of the sensor units 110, local computing device 115, 120, control panel 135, and/or remote computing device 140 described with reference to FIGS. 1-4, and/or aspects of one or more of the apparatus 205, 205-a, or 205-b described with reference to FIGS. 2-4, and/or aspects of the apparatus 505 with reference to FIG. 5. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

In some situations, it may desirable for a user to indicate to the home automation system a preferred distinguishing feature to be indexed, at the moment that the distinguishing feature, such as a person or event, is present or occurring. Thus, at block 805, the method 800 may include receiving an auditory or gestural command, or a combination thereof, from a user at the home automation system. This auditory or gestural command may be detected by one or more sensor unit, for example using a microphone, a motion detector, or the like. The auditory command may be, for example, a predetermined phrase such as, "Vivint, record this," or any other suitable phrase, while the gestural command may be any appropriate finger, hand, or body motion, such as a "thumbs up" signal. For example, a user spending time with his family in the kitchen may notice that his dog is performing a new trick which the user wishes to preserve on video to send later to family and friends. Thus, the user may notice the dog's trick and speak aloud, "Vivint, capture this."

At block 810, the method 800 may include indexing the video footage based, at least in part, on the received auditory or gestural command from the user. Thus, in response to receiving the audible command, "Vivint, capture this," the home automation system may flag the currently recording video footage as containing a distinguishing feature, and may index the recorded video footage accordingly. In some embodiments, in order to ensure that the entire moment of interest has been indexed, the home automation system may include in the indexed video footage fifteen seconds of footage before the user spoke the command, and an additional fifteen seconds of footage after the "moment of action" has passed. For example, the system may index footage for an additional fifteen seconds or other suitable or predetermined period of time after one or more sensor units detect that the dog is no longer in motion. In this way, users may ensure that moments of interest are properly indexed, even without prior user input of particular preferences.

Thus, the method 800 may provide for indexing video footage based on received commands in a security and/or automation system. It should be noted that the method 800 is just one implementation and that the operations of the method 800 may be rearranged or otherwise modified such that other implementations are possible.

In some examples, aspects from two or more of the methods 600, 700, 800 may be combined and/or separated. It should be noted that the methods 600, 700, 800 are just example implementations, and that the operations of the methods 600, 700, 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems at a computing device, comprising:
    receiving, at the computing device, a plurality of video footage at a premises and at least one user preference at the premises;
    reviewing, by the computing device, the plurality of video footage recorded over a predetermined period of time, wherein the predetermined period of time is based at least in part on an activity of an occupant present in the plurality of video footage;
    automatically detecting, by the computing device, a pattern in the received at least one user preference at the premises;
    determining, by the computing device, a second user preference based at least in part on the detected pattern in the received at least one user preference;
    automatically identifying, by the computing device, a first distinguishing feature in the video footage based at least in part on the received at least one user preference, the determined second user preference, and reviewing the plurality of video footage; and
    automatically indexing, by the computing device, the video footage based at least in part on the first distinguishing feature, wherein the indexing comprises grouping a plurality of individual clips of the video footage that comprise the first distinguishing feature.

2. The method of claim 1, further comprises:
    automatically indexing, by the computing device, at least one extended clip of video footage based at least in part on the received at least one user preference, or the detected pattern, or a combination thereof.

3. The method of claim 1, wherein receiving the plurality of video footage at the premises and the at least one user preference at the premises comprises:
    receiving, at the computing device, the at least one user preference associated with one or more distinguishing features comprising at least the first distinguishing feature, the one or more distinguishing features to be identified in the video footage.

4. The method of claim 3, wherein the received at least one user preference comprises one or more of an identified animate object, an audio feature, a visual feature, a time, a location, a detected increased occupancy, a detected motion, or an expression.

5. The method of claim 4, wherein indexing the video footage comprises:
    identifying, by the computing device, the plurality of individual clips of the video footage that comprise an identified common distinguishing feature corresponding to the first distinguishing feature.

6. The method of claim 1, further comprises:
    reviewing, by the computing device, the plurality of video footage recorded over the predetermined period of time based at least in part on the received at least one user preference.

7. The method of claim 1, wherein receiving the at least one user preference comprises:
    receiving, via one or more sensors coupled to the computing device, an auditory or a gestural command, or a combination thereof, from a user, wherein automatically indexing the video footage is based at least in part on the received auditory or gestural command from the user.

8. The method of claim 1, further comprising:
    monitoring, by the computing device, a currently recording video footage at the premises;
    identifying, by the computing device, at least one emergency event in the currently recording video footage based at least in part on a facial recognition, a motion, a vibration, a vital sign, or a combination thereof; and
    communicating an emergency alert to a third party.

9. The method of claim 1, wherein the video footage is assembled into any of at least one thumbnail, clip, a condensed video clip, a single-cut video, a still photograph, or a combination thereof.

10. The method of claim 9, further comprising:
    displaying, at an interface of the computing device, the condensed video clip to a user of the premises; and
    extending, by the computing device, the condensed video clip based at least in part on a selection received from the user.

11. An apparatus for security and/or automation systems, comprising:
    a processor;
    memory in electronic communication with the processor; and
    instructions stored in the memory, the instructions being executable by the processor to:
        receive a plurality of video footage at a premises and at least one user preference at the premises;
        review the plurality of video footage recorded over a predetermined period of time, wherein the predetermined period of time is based at least in part on an activity of an occupant present in the plurality of video footage;
        automatically detect a pattern in the received at least one user preference at the premises;
        determine a second user preference based at least in part on the detected pattern in the received at least one user preference;

automatically identify a first at least one distinguishing feature in the video footage based at least in part on the received at least one user preference, the determined second user preference, and reviewing the plurality of video footage; and automatically index the video footage based at least in part on the first distinguishing feature, wherein the indexing comprises grouping a plurality of individual clips of the video footage that comprise the first distinguishing feature.

12. The apparatus of claim 11, wherein the processor is further configured to:

index at least one extended clip of video footage based at least in part on the received at least one user preference, or the detected pattern, or a combination thereof.

13. The apparatus of claim 11, wherein the processor is further configured to:

receive the at least one user preference associated with one or more distinguishing features comprising at least the first distinguishing feature, the one or more distinguishing features to be identified in the video footage.

14. The apparatus of claim 13, wherein the received at least one user preference comprises one or more of an identified animate object, an audio feature, a visual feature, a time, a location, a detected increased occupancy, a detected motion, or an expression.

15. A non-transitory computer-readable medium storing computer-executable code, the code executable by a processor to:

receive a plurality of video footage at a premises and at least one user preference at the premises;

review the plurality of video footage recorded over a predetermined period of time, wherein the predetermined period of time is based at least in part on an activity of an occupant present in the plurality of video footage;

automatically detect a pattern in the received at least one user preference at the premises;

determine a second user preference based at least in part on the detected pattern in the received at least one user preference;

automatically identify a first distinguishing feature in the video footage based at least in part on the received at least one user preference, the determined second user preference, and reviewing the plurality of video footage; and automatically index the video footage based at least in part on the first distinguishing feature, wherein the indexing comprises grouping a plurality of individual clips of the video footage that comprise the first distinguishing feature.

* * * * *